United States Patent
Bays et al.

(10) Patent No.: US 10,887,228 B2
(45) Date of Patent: *Jan. 5, 2021

(54) DISTRIBUTED METHODOLOGY FOR PEER-TO-PEER TRANSMISSION OF STATEFUL PACKET FLOWS

(71) Applicant: AT&T Intellectual Property I, L. P., Atlanta, GA (US)

(72) Inventors: Robert Bays, San Francisco, CA (US); Mike Larson, San Francisco, CA (US); Stephen Hemminger, Beaverton, OR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,307

(22) Filed: Feb. 8, 2019

(65) Prior Publication Data

US 2019/0173787 A1  Jun. 6, 2019

Related U.S. Application Data

(63) Continuation of application No. 15/476,820, filed on Mar. 31, 2017, now Pat. No. 10,243,849, which is a
(Continued)

(51) Int. Cl.
*H04L 12/741* (2013.01)
*H04L 29/08* (2006.01)
(Continued)

(52) U.S. Cl.
CPC .......... *H04L 45/74* (2013.01); *G06F 9/45558* (2013.01); *H04L 45/302* (2013.01);
(Continued)

(58) Field of Classification Search
CPC ... H04L 43/028; H04L 43/04; G06F 9/45558; G06F 9/5072; G06F 9/5077; G06F 2009/4557
See application file for complete search history.

(56) References Cited

U.S. PATENT DOCUMENTS 7,571,156 B1  4/2009 Gupta
8,717,895 B2  5/2014 Koponen et al.
(Continued)

FOREIGN PATENT DOCUMENTS

CN  1783841  6/2006
CN  102771094  11/2012
(Continued)

OTHER PUBLICATIONS

Office Action for CN 201580056868.6, dated Feb. 3, 2020, 5 pages.
(Continued)

*Primary Examiner* — Pao Sinkantarakorn
(74) *Attorney, Agent, or Firm* — Guntin & Gust, PLC; Atanu Das

(57) ABSTRACT

Techniques for enabling peer-to-peer transmission of stateful packet flows in a network environment are provided. In certain embodiments, a computer system receives a packet belonging to a stateful flow, determines a query subset from a plurality of query subsets based on information from the packet, determines a first forwarding plane from a plurality of forwarding planes as an owner of the query subset, sends the packet to the first forwarding plane that owns the query subset, receives from the first forwarding plane information indicating that a second forwarding plane from the plurality of forwarding planes is a state analysis owner for the packet, and transmits the packet to the second forwarding plane. Examples of stateful flow include firewall traffic, network address translation traffic, or application layer classification for Quality of Service. In certain embodiments, the state analysis owner for the stateful flow may perform routing functions for the packet.

20 Claims, 8 Drawing Sheets

Related U.S. Application Data continuation of application No. 15/159,567, filed on May 19, 2016, now Pat. No. 9,843,515, which is a continuation of application No. 14/262,694, filed on Apr. 25, 2014, now Pat. No. 9,374,302.

(60) Provisional application No. 61/816,571, filed on Apr. 26, 2013.

(51) Int. Cl.
| | |
|---|---|
| *H04L 12/725* | (2013.01) |
| *H04L 12/851* | (2013.01) |
| *G06F 9/455* | (2018.01) |
| *H04L 12/713* | (2013.01) |
| *H04L 12/801* | (2013.01) |

(52) U.S. Cl.
CPC ............ *H04L 45/586* (2013.01); *H04L 47/10* (2013.01); *H04L 47/2441* (2013.01); *H04L 67/104* (2013.01); *G06F 2009/45595* (2013.01)

(56) References Cited

U.S. PATENT DOCUMENTS

| | | | |
|---|---|---|---|
| 9,143,557 | B2 | 9/2015 | Guichard et al. |
| 9,374,302 | B2 | 6/2016 | Bays et al. |
| 9,948,554 | B2 | 4/2018 | Bays |
| 2006/0072480 | A1 | 4/2006 | Deval et al. |
| 2012/0281520 | A1 | 11/2012 | Ansari et al. |
| 2013/0044636 | A1 | 2/2013 | Koponen et al. |
| 2013/0058215 | A1 | 3/2013 | Koponen et al. |
| 2013/0058346 | A1 | 3/2013 | Sridharan et al. |
| 2013/0079093 | A1 | 6/2013 | Rebella et al. |
| 2013/0223226 | A1 | 8/2013 | Narayanan et al. |
| 2014/0003232 | A1 | 1/2014 | Guichard et al. |
| 2014/0286352 | A1 | 9/2014 | Turgeman et al. |
| 2014/0328159 | A1 | 11/2014 | Rebella et al. |
| 2014/0341218 | A1 | 11/2014 | Bays et al. |
| 2015/0131989 | A1 | 5/2015 | Syed et al. |
| 2016/0173371 | A1 | 6/2016 | Bays |
| 2017/0126560 | A1 | 5/2017 | Bays et al. |
| 2018/0205645 | A1 | 7/2018 | Bays |

FOREIGN PATENT DOCUMENTS

| | | |
|---|---|---|
| CN | 107078956 | 8/2017 |
| WO | 2013055697 A1 | 4/2013 |
| WO | 2015065290 | 5/2015 |
| WO | 2016094825 | 6/2016 |

OTHER PUBLICATIONS

Notice of Decision to Grant for EP 15817716.2, dated Jan. 30, 2020, 2 pages.
Invitation Pursuant to Rule 62a(1) EPC for EP 19209098.3, dated Jan. 28, 2020, 2 pages.
Non-Final Office Action mailed for U.S. Appl. No. 15/916,376, dated Apr. 12, 2019, 14 pages.
Jingjing, et al., "The Deployment of Routing Protocols in Distributed Control Plane of SDN", The Scientific World Journal, vol. 2014, Aug. 28, 2014, pp. 1-8.
Notice of Allowance mailed for U.S. Appl. No. 15/916,376, dated Jul. 18, 2019, 8 pages.
"Open Flow Switch Specification (Version 1.3.3 (Protocol version Ox04)", Open Networking Foundation, Sep. 27, 2013, 165 pages.
U.S. Appl. No. 14/262,694 , "Non-Final Office Action", dated Sep. 15, 2015, 8 pages.
U.S. Appl. No. 14/262,694 , "Notice of Allowance", dated Feb. 22, 2016, 7 pages.
U.S. Appl. No. 14/966,557 , "Non-Final Office Action", dated Jun. 30, 2017, 13 pages.
U.S. Appl. No. 14/966,557 , "Notice of Allowance", dated Dec. 12, 2017, 10 pages.
U.S. Appl. No. 15/159,567 , "Non-Final Office Action", dated May 10, 2017, 7 pages.
U.S. Appl. No. 15/159,567 , "Notice of Allowance", dated Aug. 11, 2017, 8 pages.
U.S. Appl. No. 15/476,820 , "Non Final Office Action", dated May 29, 2018, 11 pages.
U.S. Appl. No. 15/476,820 , "Notice of Allowance", dated Nov. 6, 2018, 9 pages.
EP15817716.2 , "Office Action", dated May 9, 2018, 4 pages.
Hintjens , "The ZeroMQ Guide—for C Developers", Available online at: https://lqhl.me/resources/zguide-c.pdf, Jan. 5, 2016, 494 pages.
Moon et al., "Bridging the Software/hardware Forwarding Divide", Technical report, University of California at Berkeley, Nov. 2010, 15 pages.
PCT/US2015/065290 , "International Preliminary Report on Patentability", dated Feb. 23, 2017, 31 pages.
PCT/US2015/065290 , "International Search Report and Written Opinion", dated Mar. 2, 2016, 15 pages.
PCT/US2015/065290 , "Written Opinion", dated Nov. 9. 2016, 9 pages.
Vaghani et al., "A Comparison of Data Forwarding Schemes for Network Resiliency in Software Defined Networking", The 9th International Conference on Future Networks and Communications (FNC'14)/The 11th International Conference on Mobile Systems and Pervasive Computing (MobiSPC'14)/Affiliated Workshops, Procedia Computer Science, vol. 34, Aug. 15, 2014, pp. 680-685.
Yang et al., "Forwarding and Control Element Separation (ForCES) Framework", Network Working Group, Request for Comments: 3746, Category: Informational, Apr. 1, 2004, 40 pages.
EP19209098.3 , "Extended European Search Report", dated Mar. 18, 2020, 11 pages.
Yang et al., "Forwarding and Control Element Separation (ForCES) Framework", Network Working Group, XP015009526, Apr. 2004, 40 pages.
Notice of Decision to Grant for CN 201580056868.6, dated Jun. 19, 2020, 2 pages.

DISTRIBUTED METHODOLOGY FOR PEER-TO-PEER TRANSMISSION OF STATEFUL PACKET FLOWS

CROSS-REFERENCES TO RELATED APPLICATIONS

This application is a Continuation of U.S. patent application Ser. No. 15/476,820, filed, Mar. 31, 2017, entitled "DISTRIBUTED METHODOLOGY FOR PEER-TO-PEER TRANSMISSION OF STATEFUL PACKET FLOWS", which is a Continuation of U.S. patent application Ser. No. 15/159,567, filed May 19, 2016, entitled "DISTRIBUTED METHODOLOGY FOR PEER-TO-PEER TRANSMISSION OF STATEFUL PACKET FLOWS", which is a continuation of Ser. No. 14/262,694, filed Apr. 25, 2014, now U.S. Pat. No. 9,374,302, issued Jun. 21, 2016, entitled, "DISTRIBUTED METHODOLOGY FOR PEER-TO-PEER TRANSMISSION OF STATEFUL PACKET FLOWS", which claims the benefit and priority under 35 U.S.C. 119(e) of (1) U.S. Provisional application No. 61/816,571, filed Apr. 26, 2013, entitled, "DISTRIBUTED METHODOLOGY FOR PEER-TO-PEER TRANSMISSION OF STATEFUL PACKET FLOWS." The entire contents of the 61/816,571 and Ser. Nos. 14/262,694, 15/159,567, and 15/476,820 applications are incorporated herein by reference for all purposes.

BRIEF SUMMARY OF THE INVENTION

Certain embodiments of the present invention provide techniques for providing reliable peer-to-peer transmission of packets in a networking environment.

In certain embodiments, the present disclosure describes techniques for enabling peer-to-peer transmission of stateful packet flows in a virtualized network environment. In certain embodiments, embodiments of the invention are configurable to perform an example method that receives a first packet belonging to a stateful flow. The stateful flow may be between a first virtual machine and a second virtual machine. For example, a stateful flow may include firewall traffic, network address translation (NAT) traffic, application layer classification for Quality of Service (QoS), etc. More generally, and without limiting the scope of what a stateful flow may be, a stateful flow may use a dedicated state analysis owner to parse the data packet and perform a detailed analysis of the complete data streams, flows, or sessions. A stateful flow may preserve state for each flow, such that the processing of a past packet may affect the processing or transmission of present and future data packets.

In certain embodiments, the method may access flow associating information from the first packet. Examples of such flow associating information may include the source network address, destination network address, session ID, and/or query subset for the first packet.

In certain embodiments, the method may determine a second computer system comprising a state analysis owner for the stateful flow, using the flow associating information. The second computer system may have a vPlane that is assigned as the state analysis owner.

In certain implementations, the method may determine the source network address for the source VM and the destination network address for the destination VM for the first packet. In one implementation, this information may be accessible by reading the header of the packet. The first computer system may then try to resolve the VM network address to the host computer system network address that is hosting the VM. For example, the first computer system may determine the network address for the source host computer system using the source network address for the source VM and a destination host computer system using the destination network address for the destination VM. The first computer system may compare the network address of the source host computer system and the destination host computer system, and select the host computer system with a lower network address of the source host computer system and the destination host computer system as the second computer system comprising the vPlane with the state analysis owner. In the alternative, the first computer system may select the host computer system with a higher network address of the source host computer system and the destination host computer system as the second computer system comprising the vPlane with the state analysis owner.

In another example implementation, if only one of the network addresses for the host computer system from the source and destination host computer system are resolvable, the example method may just assign the only resolvable host computer system as the second computer system comprising the vPlane with the state analysis owner.

In certain embodiments, the method may transmit the first packet to the second computer system comprising the state analysis owner for the stateful flow.

In certain implementations, the state analysis owner for the stateful flow performs run-to-completion state processing on the first packet once. In other implementations, the state analysis owner for the stateful flow performs routing functions for the packets between the first virtual machine and the second virtual machine.

In certain embodiments, the above described example method may be implemented using a non-transitory computer readable medium having stored thereon program code executable by a processor, the program code comprising the steps to perform the above described method. In certain other implementations, a computer system may comprise the non-transitory computer readable medium.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive. The present disclosure describes techniques for enabling peer-to-peer transmission of stateful packet flows in a virtualized network environment. For purposes of explanation, numerous examples and details are set forth below in order to provide an understanding of various embodiments. It will be evident, however, to one skilled in the art that certain embodiments can be practiced without some of these details, or can be practiced with modifications or equivalents thereof.

Figure 1:
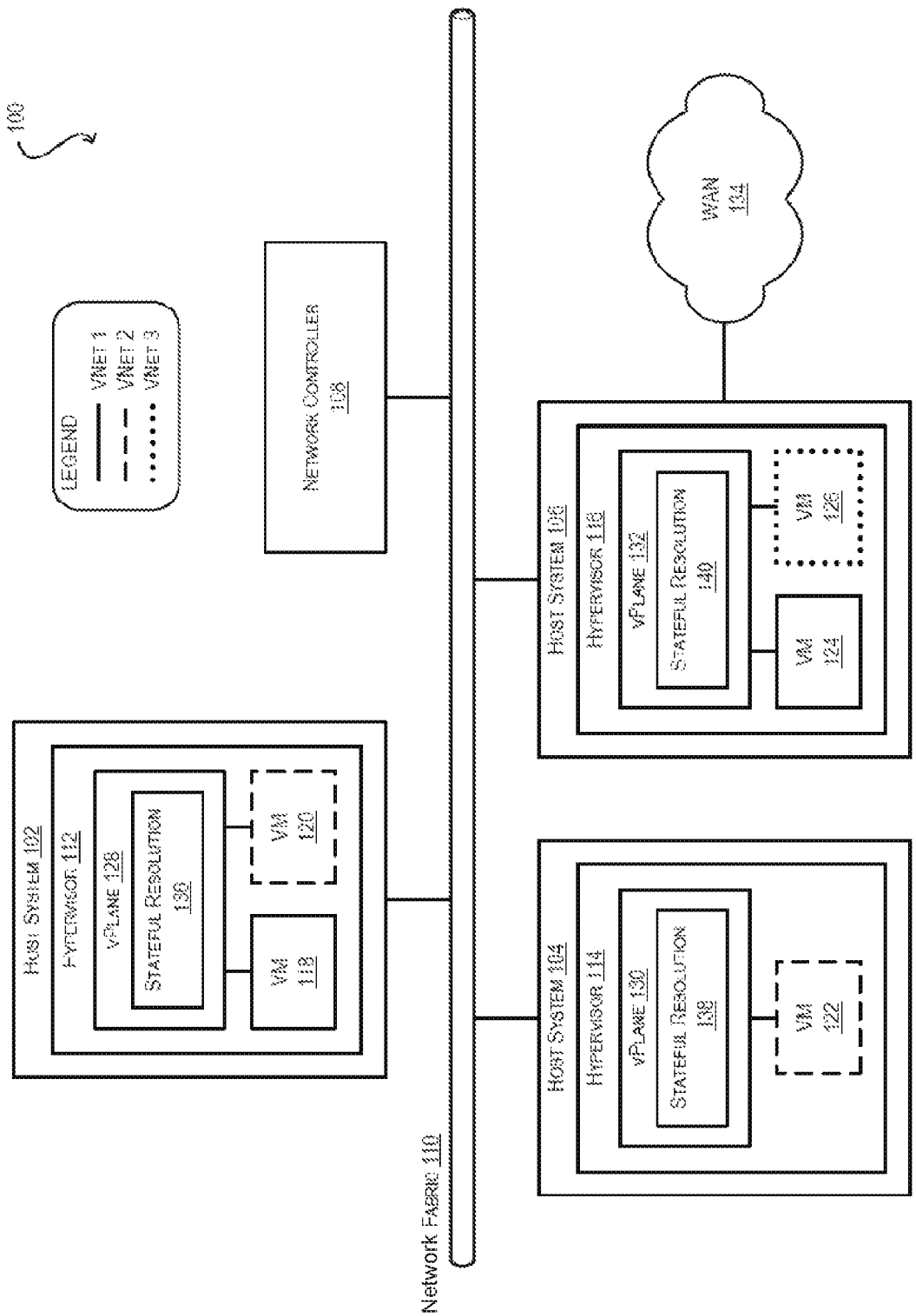
FIG. 1 depicts a virtualized network environment according to an embodiment.

FIG. 1 depicts a virtualized network environment 100 according to an embodiment. As shown, virtualized network environment 100 includes a number of host systems 102, 104, and 106 that are communicatively coupled to each other and to a network controller 108 via a physical network fabric 110 that in one example embodiment could be an IP based fabric. A second example embodiment could instead utilize an MPLS based fabric. Each host system 102-106 includes a hypervisor (112, 114, and 116) that provides an environment in which one or more virtual machines (VMs) can run. For example, hypervisor 112 of host system 102 provides an execution environment for VMs 118 and 120, hypervisor 114 of host system 104 provides an execution environment for VM 122, and hypervisor 116 of host system 106 provides an execution environment for VMs 124 and 126.

In one embodiment, hypervisors 112-116 can interact directly with the hardware platform of their respective host systems without an intervening host operating system. In this embodiment, hypervisors 112-116 can each include a virtualization kernel (not shown) that manages VM use of the various hardware devices of host systems 102-106. In an alternative embodiment, hypervisors 112-116 can be part of a "hosted" configuration in which each hypervisor runs on top of a host operating system (not shown). In this embodiment, hypervisors 112-116 can rely on their respective host operating systems for physical resource management of hardware devices. One of ordinary skill in the art will recognize various modifications and alternatives for the design and configuration of hypervisors 112-116.

In addition to VMs 118-126, hypervisors 112-116 include vPlane components 128, 130, and 132. VPlanes 128-132 are software-based forwarding planes that act as an abstraction layer between VMs 118-126 and the physical network resources of network fabric 110. This abstraction layer allows VMs 118-126 to operate in the context of virtual networks that are uncoupled from the physical network infrastructure.

For example, as shown in FIG. 1, VM 118 (connected to vPlane 128 on host 102) and VM 124 (connected to vPlane 132 on host 106) are part of a first virtual network "VNet 1," VM 120 (connected to vPlane 128 on host 102) and VM 122 (connected to vPlane 130 on host 104) are part of a second virtual network "VNet 2," and VM 126 (connected to vPlane 132 on host 106) is part of a third virtual network "VNet 3." In this configuration, vPlanes 128-132 can perform Layer 2/3 forwarding between VMs 118-126 that preserves the network semantics of VNets 1-3, regardless of the physical network topology between host systems 102-106. For instance, each vPlane 128-132 can maintain translation tables that map the virtual MAC/IP addresses of VMs 118-126 to physical MAC/IP or MPLS addresses of the host systems on which the VMs run. In addition, each vPlane 128-132 can maintain one or more L3 routing tables. VPlanes 128-132 can then use these translation and routing tables to tunnel data packets over network fabric 110 (if needed) in order to deliver the data packets to their intended destination host systems/VMs.

In a particular embodiment, vPlanes 128-132 can perform the forwarding described above in a direct (i.e., peer-to-peer) manner between host systems 102-106 (or within a single host system) using information contained within the translation tables and the L3 routing tables without relying on an external device/appliance for routing decisions. In further embodiments, vPlanes 128-132 can perform additional networking functions, such as various L4-L7 services (e.g., load balancing, application level security/QoS, etc.).

The configuration of vPlanes 128-132 can be managed by network controller 108. For example, network controller 108 can determine the content of the translation/routing tables used by vPlanes 128-132 and program this information into each vPlane. The network controller can also be responsible for configuration and operation of layer 4-7 services in the vPlane such as firewall, Network Address Translation, QoS, or Deep Packet Inspection. In addition, network controller 108 can perform other management plane functions, such as vPlane lifecycle management, network monitoring, and so on.

One complication with forwarding L3 packet flows in a peer-to-peer manner between VMs 118-126 (or to/from an external WAN 134) involves dealing with stateful flows (e.g., firewall traffic, NAT traffic, application layer classification for QoS, etc.). For a stateful flow, one of the vPlanes 128-132 (either the source or destination vPlane) should perform "run-to-completion" state processing on the data traffic. For example, packets in a flow between VM 122 and 124 must pass through both vPlane 130 and vPlane 132. If vPlane 130 is selected as the "run-to-completion" vPlane, then it will act as the router between the two VMs. vPlane 132 effectively acts as a L2 switch between the routing vPlane 130 and VM 124. The same vPlane should perform this run-to-completion processing for all of the packets in both directions in the stateful flow, since the processing should be based on a consistent set of state information (e.g., state tables) maintained at a single vPlane. Thus, it is important to decide which vPlane will be the "state analysis owner" for a given stateful flow as both forward and return packets need to be processed in one location.

For stateful flows where either the source and/or destination IP addresses are known to belong to specific VMs in a Virtual Network (e.g., can be resolved to a particular VM 118-126 through a query of the translation tables), each vPlane 128-132 can implement a set of preconfigured rules for autonomously determining the state analysis owner. For example, if both the source and destination address for a flow between two VMs are present in the Translation Tables, each vPlane 128-132 can choose the vPlane that is resident on the host system with the lower IP address as the state analysis owner. As another example, if only one of the two VM addresses is known, each vPlane 128-132 can choose the host system where the VM is resident. These rules can be implemented within, e.g., a "stateful resolution" component shown via reference numerals 136-140.

However, for stateful flows where both the source and destination IP addresses are unknown, a mechanism is needed for selecting a state analysis owner and recording this selection. It would be preferable to implement this mechanism in a way that can scale to large deployments as typically found in data centers and other enterprise environments.

To address the foregoing and other similar issues, embodiments of the present invention provide a distributed methodology for determining which vPlane in a virtualized network environment should own the run-to-completion state processing for a stateful flow.

In a particular embodiment, each vPlane can be assigned a "query subset" of flows that it is responsible for. This assignment of query subsets can be programmed into all vPlanes via the network controller. In one embodiment, the query subset defines flow associations based on the IP addresses used by a stateful service, for example a NAT service. When a first vPlane in the environment receives the first packet in a stateful flow and cannot resolve the flow's state analysis owner, the first vPlane can forward the packet to a second helper vPlane in the environment that owns the query subset comprising the flow. The helper vPlane can process the first packet and forward it to the proper destination vPlane. The helper vPlane will then notify the source vPlane of the proper destination vPlane. The source vPlane can then forward all subsequent packets in the flow directly to the destination vPlane.

In another embodiment, the first vPlane may send a request packet to a second helper vPlane in the environment that owns the query subset comprising the flow. The second vPlane can then identify the state analysis owner to the first vPlane, which can subsequently forward the packet to the identified owner.

Figure 2:
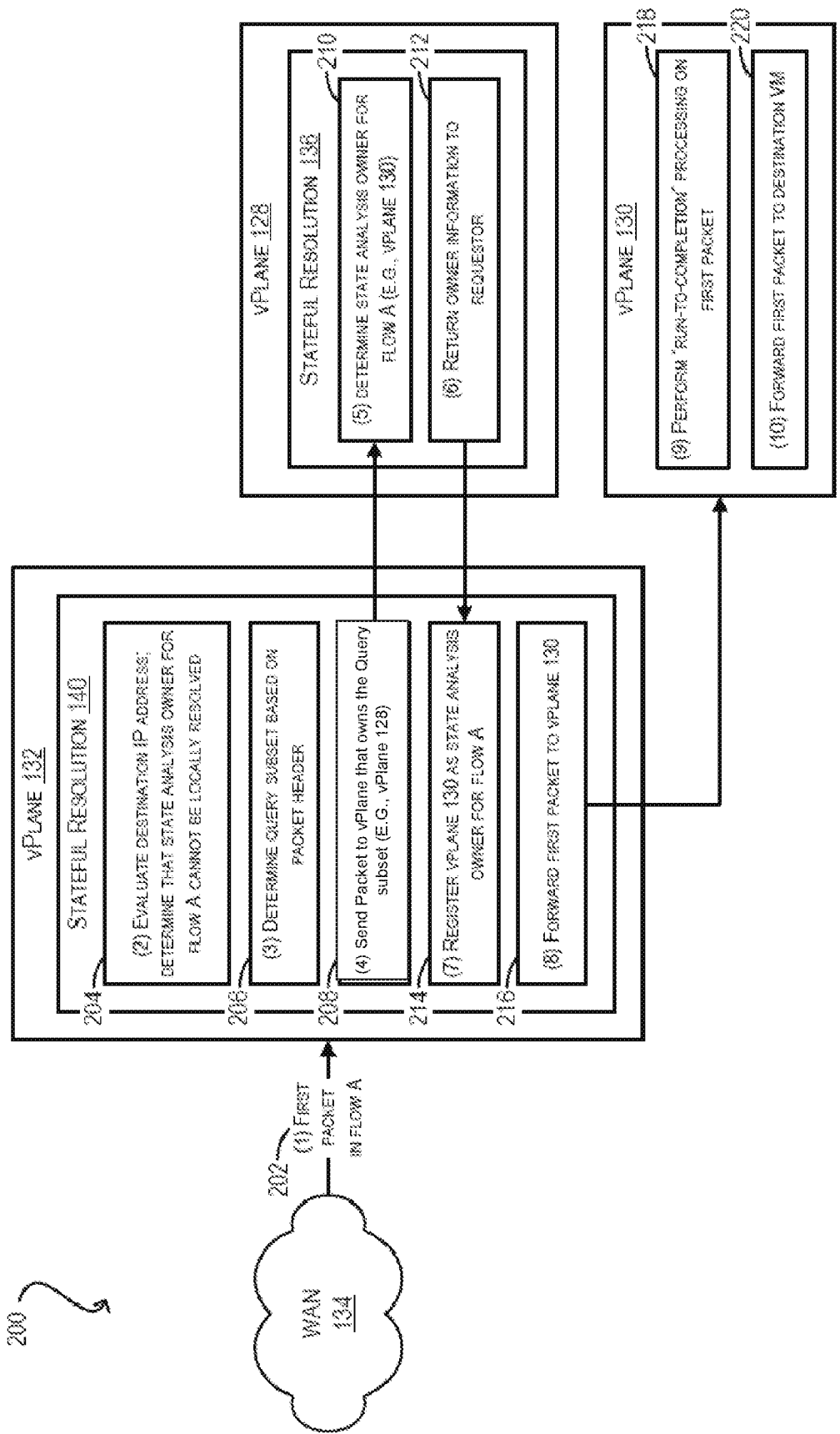
FIG. 2 is a flow diagram that illustrates an example of this distributed methodology as implemented in virtualized network environment of FIG. 1 according to an embodiment.

FIG. 2 is a flow diagram 200 that illustrates an example of this distributed methodology as implemented in virtualized network environment 100 of FIG. 1 according to an embodiment. For simplicity, FIG. 2 depicts vPlanes 128-132 as the main entities in virtualized network environment 100 and omits host systems 102-106 and hypervisors 112-116.

At step (1) of flow diagram 200 (reference numeral 202), vPlane 132 can receive, from WAN 134, a first packet in a stateful flow "A" that is destined for a host/vPlane in IP fabric 110. Thus, in this example, vPlane 132 acts as a gateway between WAN 134 and IP fabric 110.

Upon receiving the first packet, stateful resolution component 140 of vPlane 132 can evaluate the destination IP address in the packet and determine that the address is unknown (step (2), reference numeral 204). This situation may occur if, e.g., network address translation (NAT) needs to be performed on the destination IP address in order to determine the true address of the destination host system in IP fabric 110. As a result, stateful resolution component 140 is unable to autonomously determine a state analysis owner for stateful flow A.

At step (3) (reference numeral 206), stateful resolution component 140 can determine a query subset based on the header of the first packet. This determination can be performed by applying a predetermined function to one or more fields of the packet header. Stateful resolution component 140 can then determine a particular vPlane in environment 100 that is assigned the query subset (e.g., vPlane 128) and can forward the packet to that vPlane (step (4), reference numeral 208).

At step (5) (reference numeral 210), stateful resolution component 136 of vPlane 128 can receive the packet and determine, based on the identification of flow A, a corresponding state analysis owner for the flow (e.g., vPlane 130). Stateful resolution component 136 can then forward the packet and return the owner information to vPlane 132 (step (6), reference numeral 212).

Upon receiving the owner information, stateful resolution component 140 of vPlane 132 can register vPlane 130 as the state analysis owner for flow A and forward the remaining packets in the flow to vPlane 130 (steps (7) and (8), reference numerals 214-216).

At step (9) (reference numeral 218), vPlane 130 can receive the first packet and perform run-to-completion state processing on the packet. Finally, vPlane 130 can forward the first packet to the destination VM (step (10), reference numeral 220).

With the methodology shown in FIG. 2, there is no centralized database of associations between and state analysis owners; rather, this information is distributed among all of the vPlanes per the assigned query subsets. Accordingly, this methodology can more easily scale to large deployments, since the bandwidth and processing needed to determine state ownership is spread across the fabric. As new vPlanes are added or removed from the environment, the network controller can re-assign query subsets across the current active set of vPlanes to ensure that the load remains evenly balanced.

Figure 3:
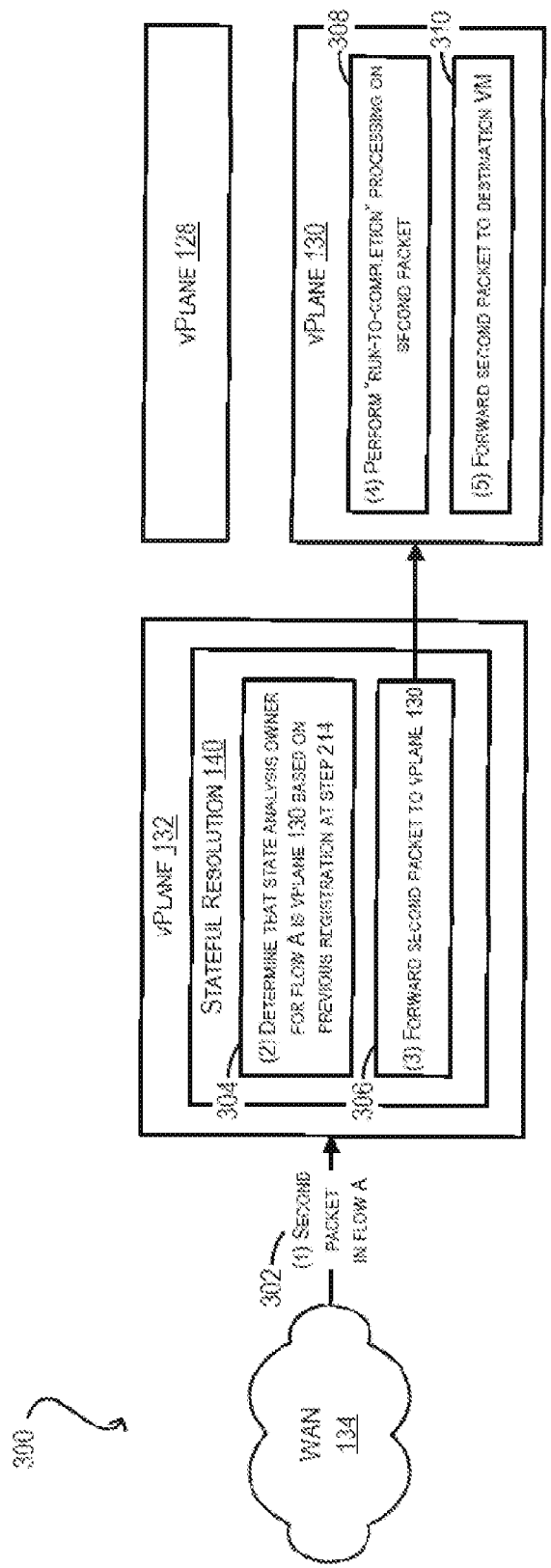
FIG. 3 is another flow diagram that illustrates an example of this distributed methodology as implemented in virtualized network environment of FIG. 1 according to an embodiment.

In certain embodiments, once vPlane 132 has determined that vPlane 130 is the state analysis owner for stateful flow A, there is no need to query vPlane 128 (i.e., the vPlane that is assigned the query subset that includes flow A) upon receiving further packets in the same flow. Instead, vPlane 132 can forward those further packets directly to vPlane 130 for run-to-completion processing. This concept is shown in FIG. 3 via flow diagram 300.

At step (1) of flow diagram 300 (reference numeral 302), vPlane 132 can receive a second packet in stateful flow A from WAN 134. At step (2) (reference numeral 304), stateful resolution component 140 can determine that the state analysis owner for flow A is vPlane 130 based on the registration previously performed at reference numeral 214 of FIG. 2. Accordingly, vPlane 132 can forward the second packet directly to vPlane 130 (step (3), reference numeral 306).

In response, vPlane 130 can process and forward the second packet to the destination VM in a manner substantially similar to 218-220 of FIG. 2 (steps (4) and (5), reference numerals 308-310).

Figure 4:
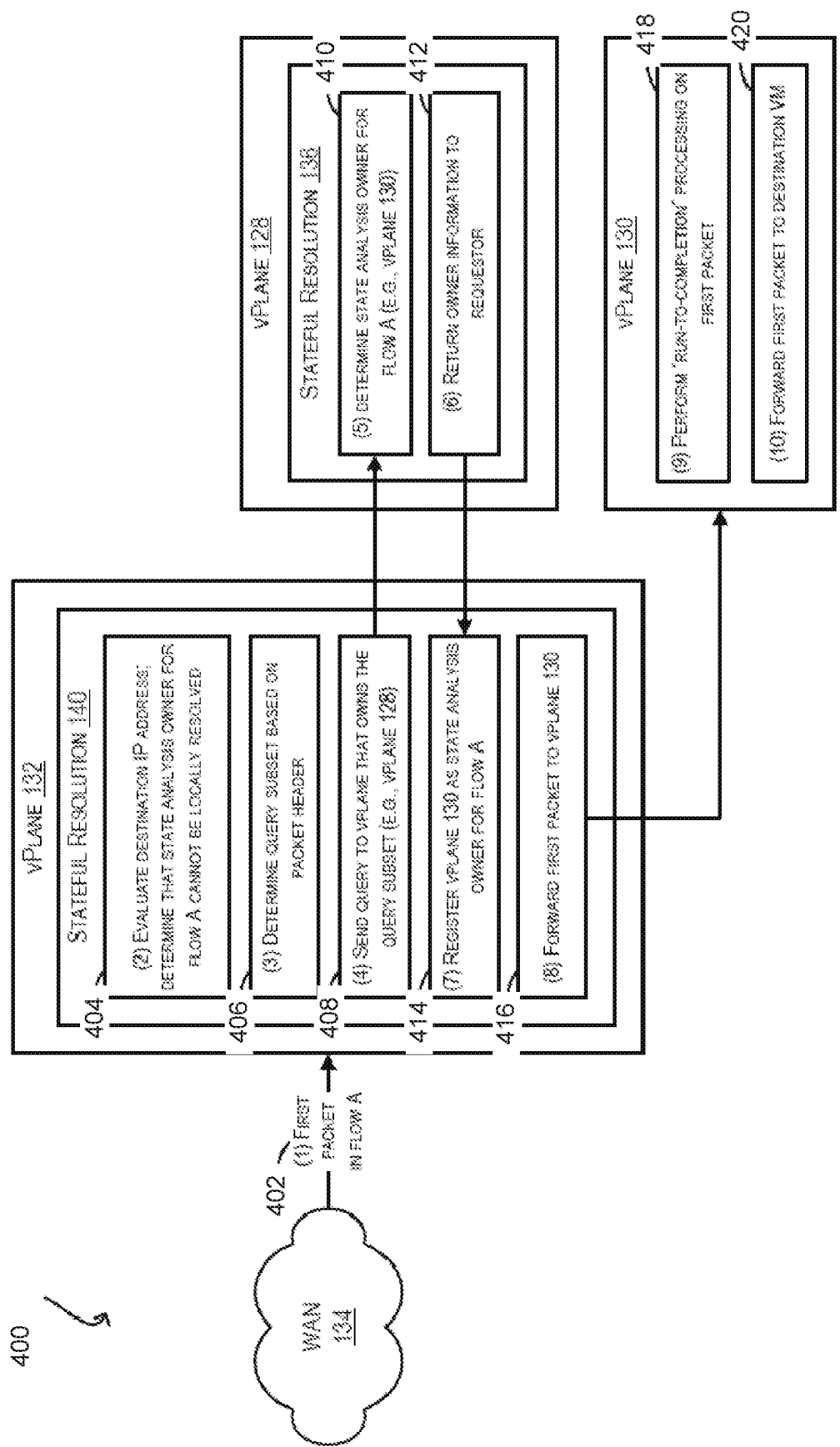
FIG. 4 is yet another flow diagram that illustrates an example of this distributed methodology as implemented in virtualized network environment of FIG. 1 according to another embodiment.

FIG. 4 is another flow diagram 400 that illustrates an another example of this distributed methodology as implemented in virtualized network environment 100 of FIG. 1 according to an embodiment. For simplicity, FIG. 4 also depicts vPlanes 128-132 as the main entities in virtualized network environment 100 and omits host systems 102-106 and hypervisors 112-116.

At step (1) of flow diagram 400 (reference numeral 402), vPlane 132 can receive, from WAN 134, a first packet in a stateful flow "A" that is destined for a host/vPlane in IP fabric 110. Thus, in this example, vPlane 132 acts as a gateway between WAN 134 and IP fabric 110.

Upon receiving the first packet, stateful resolution component 140 of vPlane 132 can evaluate the destination IP address in the packet and determine that the address is unknown (step (2), reference numeral 404). This situation may occur if, e.g., network address translation (NAT) needs to be performed on the destination IP address in order to determine the true address of the destination host system in IP fabric 110. As a result, stateful resolution component 140 is unable to autonomously determine a state analysis owner for stateful flow A.

At step (3) (reference numeral 406), stateful resolution component 140 can determine a query subset based on the header of the first packet. This determination can be performed by applying a predetermined function to one or more fields of the packet header. Stateful resolution component 140 can then determine a particular vPlane in environment 100 that is assigned the query subset (e.g., vPlane 128) and can send a query to that vPlane (step (4), reference numeral 408). The query can include information that identifies flow A.

At step (5) (reference numeral 410), stateful resolution component 136 of vPlane 128 can receive the query and determine, based on the identification of flow A, a corresponding state analysis owner for the flow (e.g., vPlane 130). Stateful resolution component 136 can return this owner information to vPlane 132 (step (6), reference numeral 412).

Upon receiving the owner information, stateful resolution component 140 of vPlane 132 can register vPlane 130 as the state analysis owner for flow A and forward the first packet to vPlane 130 (steps (7) and (8), reference numerals 414-416).

At step (9) (reference numeral 418), vPlane 130 can receive the first packet and perform run-to-completion state processing on the packet. Finally, vPlane 130 can forward the first packet to the destination VM (step (10), reference numeral 420).

With the methodology shown in FIG. 4, there is no centralized database of associations between flows and state analysis owners; rather, this information is distributed among all of the vPlanes per the assigned query subsets. Accordingly, this methodology can more easily scale to large deployments, since the bandwidth and processing needed to determine state ownership is spread across the fabric. As new vPlanes are added or removed from the environment, the network controller can re-assign query subsets across the current active set of vPlanes to ensure that the load remains evenly balanced.

In certain embodiments, once vPlane 132 has determined that vPlane 130 is the state analysis owner for stateful flow A, there is no need to query vPlane 128 (i.e., the vPlane that is assigned the query subset that includes flow A) upon receiving further packets in the same flow. Instead, vPlane 132 can forward those further packets directly to vPlane 130 for run-to-completion processing. This concept is shown in FIG. 3, as described above, via flow diagram 300.

Figure 5:
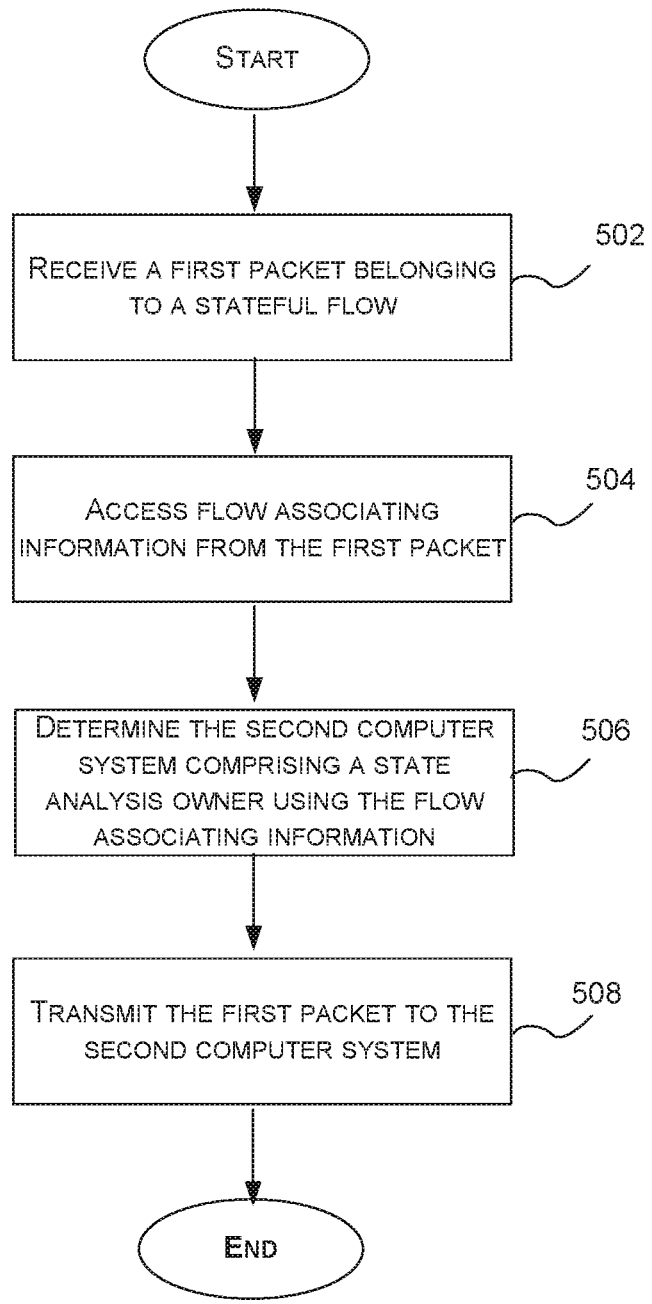
FIG. 5 is yet another flow diagram that illustrates an example of this distributed methodology as implemented in virtualized network environment of FIG. 1 according to another embodiment.

FIG. 5 depicts a simplified flowchart 500 illustrating the method performed according to one or more embodiments of the invention. According to one or more aspects, any and/or all of the methods and/or method steps described herein may be implemented by components of the computer device 700 described in FIG. 7 and network device 800 described in FIG. 8. In one embodiment, one or more of the method steps described below with respect to FIG. 5 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At step 502, a first computer system, receives a first packet belonging to a stateful flow via the transceiver of the first computer system. The stateful flow may be between a first virtual machine and a second virtual machine. For example, a stateful flow may include firewall traffic, network address translation (NAT) traffic, application layer classification for Quality of Service (QoS), etc. More generally, and without limiting the scope of what a stateful flow may be, a stateful flow may use a dedicated state analysis owner to parse the data packet and perform a detailed analysis of the complete data streams, flows, or sessions. A stateful flow may preserve state for each flow, such that the processing of a past packet may affect the processing or transmission of present and future data packets. In contrast, a stateless flow may only need parsing of the individual packets without any context preservation to any related stream of packets/flows/sessions/protocols/applications.

At step 504, components of the first computer system, access flow associating information from the first packet. Examples of such flow associating information may include the source network address, destination network address, session ID, and/or query subset for the first packet.

At step 506, components of the first computer system, may determine a second computer system comprising a state analysis owner for the stateful flow, using the flow associating information. The second computer system may have a vPlane that is assigned as the state analysis owner.

In one implementation, the first computer system determines the source network address for the source VM and the destination network address for the destination VM for the first packet. In one implementation, this information may be accessible by reading the header of the packet. The first computer system may then try to resolve the VM network address to the host computer system network address that is hosting the VM. For example, the first computer system may determine the network address for the source host computer system using the source network address for the source VM and a destination host computer system using the destination network address for the destination VM. The first computer system may compare the network address of the source host computer system and the destination host computer system, and select the host computer system with a lower network address of the source host computer system and the destination host computer system as the second computer system comprising the vPlane with the state analysis owner. In the alternative, the first computer system may select the host computer system with a higher network address of the source host computer system and the destination host computer system as the second computer system comprising the vPlane with the state analysis owner.

In another embodiment, if only one of the host computer system from the source and destination host computer system are resolvable at the first computer system, the first computer system may just assign the only resolvable host computer system as the second computer system comprising the vPlane with the state analysis owner.

At step 508, the first computer system may transmit the first packet to the second computer system.

In certain implementations, the state analysis owner for the stateful flow performs run-to-completion state processing on the first packet. In other implementations, the state analysis owner for the stateful flow performs routing functions for the packets between the first virtual machine and the second virtual machine.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 6:
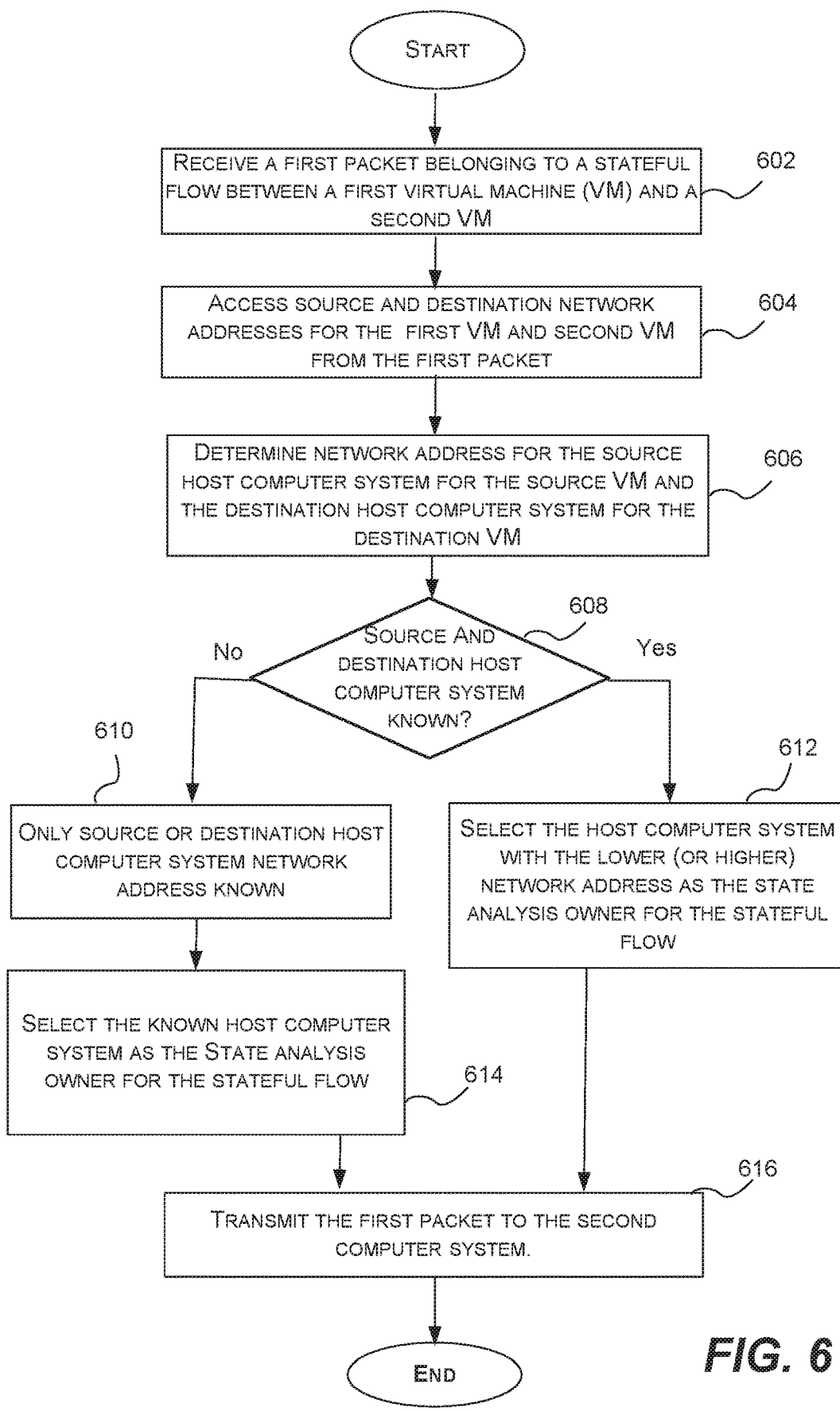
FIG. 6 is yet another flow diagram that illustrates an example of this distributed methodology as implemented in virtualized network environment of FIG. 1 according to another embodiment.

FIG. 6 depicts a simplified flowchart 600 illustrating the method performed according to one or more embodiments of the invention. According to one or more aspects, any and/or all of the methods and/or method steps described herein may be implemented by components of the network device 700 described in FIG. 7 and network device 800 described in FIG. 8. In one embodiment, one or more of the method steps described below with respect to FIG. 6 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At step 602, components of a computer system, such as a transceiver, receives a first packet belonging to a stateful flow via the transceiver of the first computer system. The stateful flow may be between a first virtual machine and a second virtual machine. For example, a stateful flow may include firewall traffic, network address translation (NAT) traffic, application layer classification for Quality of Service (QoS), etc. More generally, but without limiting the scope of what a stateful flow may be, a stateful flow may need a dedicated state analysis owner to parse the data packet and perform a detailed analysis of the complete data streams, flows, sessions. A stateful flow may preserve state for each flow, such that the processing of a past packet may affect the processing or transmission of present and future data packets. In contrast, a stateless flow may need a parsing of the individual packets without any context preservation to any related stream of packets/flows/sessions/protocols/applications.

At step 604, components of the first computer system, access the source network address and the destination network address from the first packet belonging to the source virtual machine and the destination virtual machine.

At step 606, components of the computer system, may determine the network address for the source host computer system that is hosting the source virtual machine and the destination host computer system that is hosting the destination virtual machine.

At step 608, components of the computer system, may check if the network addresses of the source and destination host computer system is resolvable and known at the computer system. In one implementation, the computer system may have locally stored translation tables for resolving the host addresses for the virtual machines. If the network address of neither the source host computer system or the destination host computer system is resolvable (not shown), then the computer system may drop the packet, perform steps described in FIGS. 2, 3 and 4 or take other remedial steps.

At step 612, components of the computer system, in one embodiment, if the network addresses of the source and destination host computer system are both resolvable, the computer system may select the host computer system with the lower network address as the state analysis owner for the stateful flow. In another implementation, the computer system may select the host computer system with the higher network address as the state analysis owner for the stateful flow.

On the other hand, at step 610, if only the source or destination host computer system network address is resolvable and known, then the known host computer system may be selected as the state analysis owner for the stateful flow (step 614).

At step 616, once the host computer system is selected as the computer system with the vPlane that is assigned as the state analysis owner, then the first packet is transmitted to the computer system selected for state analysis for further processing.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 7:
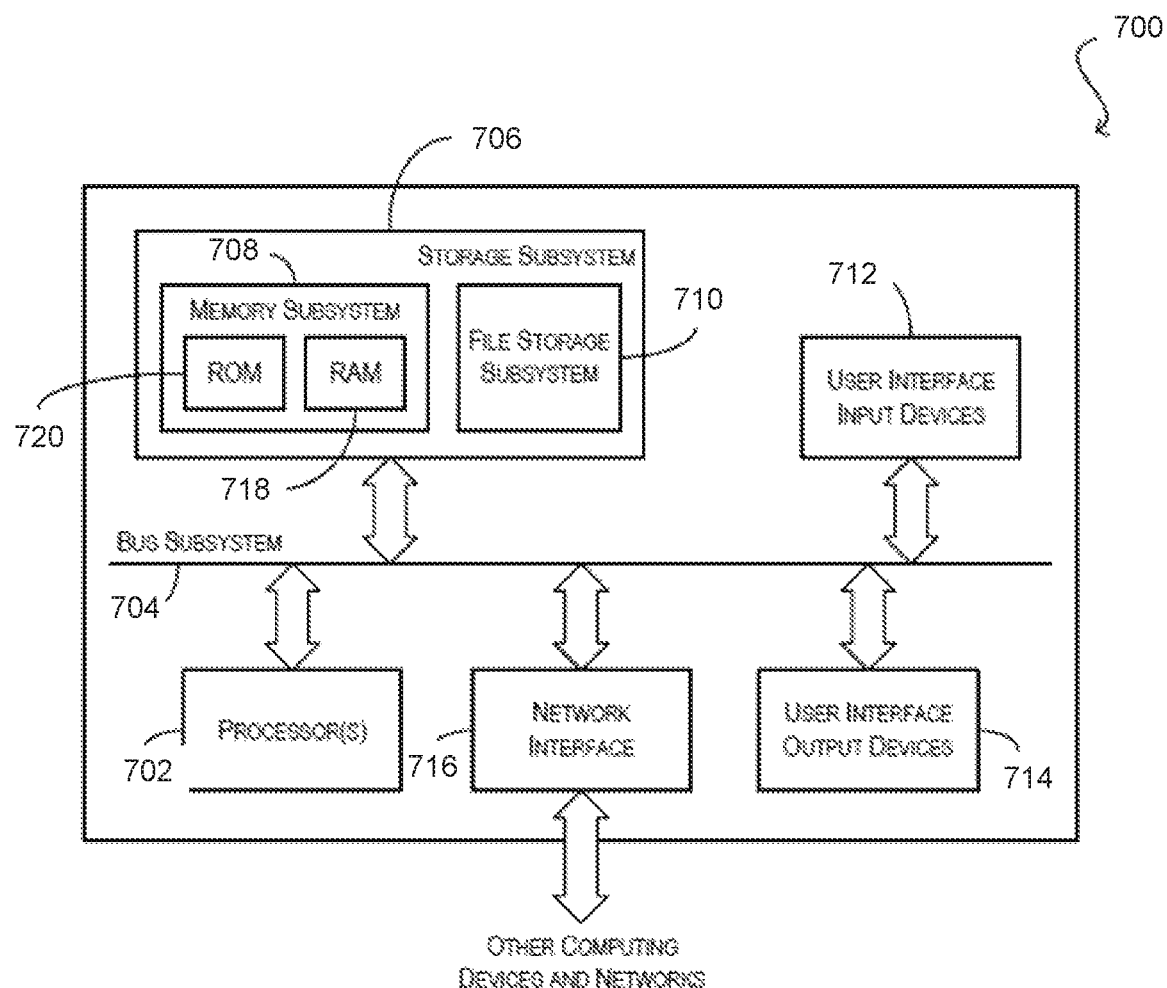
FIG. 7 is a simplified block diagram of a computer system according to an embodiment.

FIG. 7 is a simplified block diagram of a computer system 700 according to an embodiment. Computer system 700 can be used to implement any of the systems/devices depicted in virtualized network environment 100 of FIG. 1, such as host systems 102-106 and network controller 108. As shown in FIG. 7, computer system 700 can include one or more processors 702 that communicate with a number of peripheral devices via a bus subsystem 704. These peripheral devices can include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computing devices or networks. Embodiments of network interface subsystem 716 can include wired (e.g., coaxial, twisted pair, or fiber optic Ethernet) and/or wireless (e.g., Wi-Fi, cellular, Bluetooth, etc.) interfaces.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 can include a memory subsystem 708 and a file/disk storage subsystem 710. Subsystems 708 and 710 represent non-transitory computer-readable storage media that can store program code and/or data that provide the functionality of various embodiments described herein.

Memory subsystem 708 can include a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than computer system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

Figure 8:
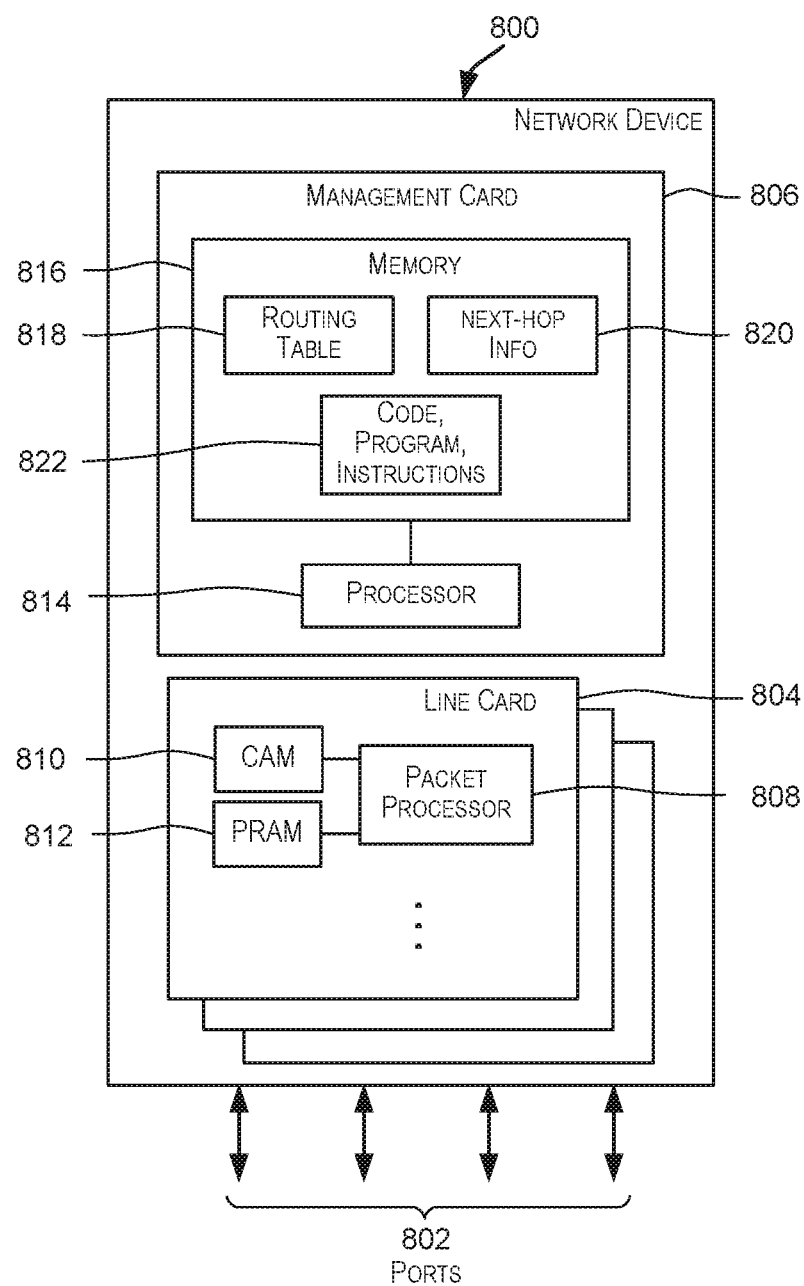
FIG. 8 depicts a simplified block diagram of a network device that may be configured to perform embodiments of the present invention.

FIG. 8 depicts a simplified block diagram of a network device 800 that may be configured to perform embodiments of the present invention. The network device 800 illustrates only one management card and linecard for illustrating purposes, but may be extended to provide multiple management cards and linecards. Network device 800 may be a router or switch that is configured to forward data such as a router or switch provided by Brocade Communications Systems, Inc. In the embodiment depicted in FIG. 8, network device 800 comprises a plurality of ports 802 for receiving and forwarding data packets and multiple cards that are configured to perform processing to facilitate forwarding of the data packets. The multiple cards may include one or more linecards 804 and one or more management cards 806. A card, sometimes also referred to as a blade or module, can be inserted into the chassis of network device 800. This modular design allows for flexible configurations with different combinations of cards in the various slots of the device according to differing network topologies and switching requirements. The components of network device 800 depicted in FIG. 8 are meant for illustrative purposes only and are not intended to limit the scope of the invention in any manner. Alternative embodiments may have more or fewer components than those shown in FIG. 8.

Ports 802 represent the I/O plane for network device 800. Network device 800 is configured to receive and forward data using ports 802. A port within ports 802 may be classified as an input port or an output port depending upon whether network device 800 receives or transmits a data packet using the port. A port over which a data packet is received by network device 800 is referred to as an input port. A port used for communicating or forwarding a data packet from network device 800 is referred to as an output port. A particular port may function both as an input port and an output port. A port may be connected by a link or interface to a neighboring network device or network. Ports 802 may be capable of receiving and/or transmitting different types of data traffic at different speeds including 1 Gigabit/sec, 10 Gigabits/sec, or more. In some embodiments, multiple ports of network device 800 may be logically grouped into one or more trunks.

Upon receiving a data packet via an input port, network device 800 is configured to determine an output port for the packet for transmitting the data packet from the network device to another neighboring network device or network. Within network device 800, the packet is forwarded from the input network device to the determined output port and transmitted from network device 800 using the output port. In one embodiment, forwarding of packets from an input port to an output port is performed by one or more linecards 804. Linecards 804 represent the data forwarding plane of network device 800. Each linecard 804 may comprise one or more packet processing entities 808 that are programmed to perform forwarding of data packets from an input port to an output port. A packet processing entity on a linecard may also be referred to as a line processing entity. Each packet processing entity 808 may have associated memories to facilitate the packet forwarding process. In one embodiment, as depicted in FIG. 8, each packet processing entity 808 may have an associated content addressable memory (CAM) 810 and a RAM 812 for storing forwarding parameters (RAM 812 may accordingly also be referred to as a parameter RAM or PRAM). In one embodiment, for a packet received via an input port, the packet is provided to a packet processing entity 808 of a linecard 804 coupled to the input port. The packet processing entity receiving the packet is configured to determine an output port of network device 800 to which the packet is to be forwarded based upon information extracted from the packet. The extracted information may include, for example, the header of the received packet. In one embodiment, a packet processing entity 808 is configured to perform a lookup in its associated CAM 810, using the extracted information. A matching CAM entry then provides a pointer to a location in the associated PRAM 812 that stores information identifying how the packet is to be forwarded within network device 800. Packet processing entity 808 then facilitates forwarding of the packet from the input port to the determined output port.

Since processing performed by a packet processing entity 808 needs to be performed at a high packet rate in a deterministic manner, packet processing entity 808 is generally a dedicated hardware device configured to perform the processing. In one embodiment, packet processing entity 808 is a programmable logic device such as a field programmable gate array (FPGA). Packet processing entity 808 may also be an ASIC.

Management card 806 is configured to perform management and control functions for network device 800 and thus represents the management plane for network device 800. In one embodiment, management card 806 is communicatively coupled to linecards 804 and includes software and hardware for controlling various operations performed by the linecards. In one embodiment, a single management card 806 may be used for all the linecards 804 in network device 800. In alternative embodiments, more than one management card may be used, with each management card controlling one or more linecards.

A management card 806 may comprise a processing entity 814 (also referred to as a management processing entity) that is configured to perform functions performed by management card 806 and associated memory 816. As depicted in FIG. 8, the routing table 818 and associated next-hop and RI information may be stored in memory 816. The next-hop and RI information may be stored and used in an optimized manner as described above. Memory 816 is also configured to store various programs/code/instructions 822 and data constructs that are used for processing performed by processing entity 814 of management card 806. For example, programs/code/instructions, which when executed by processing entity 814 cause the next-hop information to be stored in an optimized manner may be stored in memory 816. In one embodiment, processing entity 814 is a general purpose microprocessor such as a PowerPC, Intel, AMD, or ARM microprocessor, operating under the control of software 822 stored in associated memory 816. In yet other embodiments, virtual machines running on microprocessors may act as one or more execution environments running on the network device.

In one embodiment, the functions performed by management card processing entity 814 include maintaining a routing table, creating associations between routes in the routing table and next-hop information, updating the routing table and associated next-hop information responsive to changes in the network environment, and other functions. In one embodiment, management processing entity 814 is configured to program the packet processing entities and associated memories of linecards 804 based upon the routing table and associated next-hop information. Programming the packet processing entities and their associated memories enables the packet processing entities to perform data packet forwarding in hardware. As part of programming a linecard packet processing entity and its associated memories, management processing entity 814 is configured to download routes and associated next-hops information to the linecard and program the packet processing entity and associated memories. Updates to the next-hop information are also downloaded to the linecards to enable the packet processing entities on the linecards to forward packets using the updated information.

What is claimed is:

1. A method comprising:
   receiving, by a computer system, a packet belonging to a stateful flow between a first virtual machine and a second virtual machine;
   accessing, by the computer system, flow associating information from the packet, the flow associating information comprising a source network address for the first virtual machine and a destination network address for the second virtual machine;
   performing one of:
   (i) responsive to determining, by the computer system and using the source network address and the destination network address, that a network address of a source host hosting the first virtual machine is known and a network address of a destination host hosting the second virtual machine is unknown, selecting the source host as a state analysis owner for the stateful flow, or
   (ii) responsive to determining, by the computer system and using the source network address and the destination network address, that the network address of the destination host is known and the network address of the source host is unknown, selecting the destination host as the state analysis owner for the stateful flow; and
   transmitting, by the computer system, the packet to the state analysis owner.

2. The method of claim 1, wherein the state analysis owner performs run-to-completion state processing on the packet.

3. The method of claim 1, wherein the state analysis owner performs routing functions for packets between the first virtual machine and the second virtual machine.

4. The method of claim 1, wherein the stateful flow associating information further comprises one or more of a session ID or a query subset for a packet belonging to the stateful flow.

5. The method of claim 1, wherein the state analysis owner performs routing functions for the packet.

6. The method of claim 1, wherein the stateful flow comprises one of firewall traffic, network address translation (NAT) traffic, or application layer classification for Quality of Service (QoS).

7. The method of claim 1, wherein the stateful flow comprises a sequence of packets, wherein processing of a past packet affects the processing or transmission of the packet or a future packet.

8. A computer system comprising
   a processor; and
   a non-transitory computer readable medium having stored thereon executable program code that, when executed by the processor, causes the processor to perform operations comprising:
   receiving a packet belonging to a stateful flow between a first virtual machine and a second virtual machine;

accessing flow associating information from the packet, the flow associating information comprising a source network address for the first virtual machine and a destination network address for the second virtual machine;

performing one of:
(i) responsive to determining, using the source network address and the destination network address, that a network address of a source host hosting the first virtual machine is known and a network address of a destination host hosting the second virtual machine is unknown, selecting the source host as a state analysis owner for the stateful flow, or
(ii) responsive to determining, using the source network address and the destination network address that the network address of the destination host is known and the network address of the source host is known, selecting the destination host as the state analysis owner for the stateful flow; and transmitting the packet to the state analysis owner.

9. The computer system of claim 8, wherein the state analysis owner performs run-to-completion state processing on the packet.

10. The computer system of claim 8, wherein the state analysis owner performs routing functions for packets between the first virtual machine and the second virtual machine.

11. The computer system of claim 8, wherein the flow associating information further comprises one or more of a session ID or a query subset for a packet belonging to the stateful flow.

12. The computer system of claim 8, wherein the state analysis owner performs routing functions for the packet.

13. The computer system of claim 8, wherein the stateful flow comprises one of firewall traffic, network address translation (NAT) traffic, or application layer classification for Quality of Service (QoS).

14. The computer system of claim 8, wherein the stateful flow comprises a sequence of packets, wherein processing of a past packet affects the processing or transmission of the packet or a future packet.

15. A non-transitory computer readable medium having stored thereon program code that, when executed by a processor, cause the processor to perform operations comprising:

receiving a packet belonging to a stateful flow between a first virtual machine and a second virtual machine;

accessing flow associating information from the packet, the flow associating information comprising a source network address for the first virtual machine and a destination network address for the second virtual machine;

performing one of:
(i) responsive to determining, using the source network address and the destination network address, that a network address of a source host hosting the first virtual machine is known and a network address of a destination host hosting the second virtual machine is unknown, selecting the source host as a state analysis owner for the stateful flow, or
(ii) responsive to determining, using the source network address and the destination network address that the network address of the destination host is known and the network address of the source host is unknown, selecting the destination host as the state analysis owner for the stateful flow; and transmitting the packet to the state analysis owner.

16. The non-transitory computer readable medium of claim 15, wherein the state analysis owner performs run-to-completion state processing on the packet.

17. The non-transitory computer readable medium of claim 15, wherein the operations further comprise causing the state analysis owner to perform routing functions for packets between the first virtual machine and the second virtual machine.

18. The non-transitory computer readable medium of claim 15, wherein the flow associating information further comprises one or more of a session ID or a query subset for a packet belonging to the stateful flow.

19. The non-transitory computer readable medium of claim 15, wherein the operations further comprise causing the state analysis owner to perform routing functions for the packet.

20. The non-transitory computer readable medium of claim 15, wherein the stateful flow comprises one of firewall traffic, network address translation (NAT) traffic, or application layer classification for Quality of Service (QoS).

* * * * *